United States Patent
Wilfert

[11] 3,922,033
[45] Nov. 25, 1975

[54] PASSENGER MOTOR VEHICLE

[75] Inventor: Karl Wilfert, Gerlingen-Waldstadt, Germany

[73] Assignee: Daimler-Benz Aktiengesellschaft, Germany

[22] Filed: Oct. 8, 1969

[21] Appl. No.: 864,658

[30] Foreign Application Priority Data
Oct. 16, 1968 Germany.......................... 1803305
Nov. 20, 1968 Germany.......................... 1809887

[52] U.S. Cl............................ 296/146; D12/86
[51] Int. Cl.²................................... B60J 1/08
[58] Field of Search ........... 296/28, 28 A, 146, 149, 296/1 S; 244/121, 129 W; D14/3 (4.6); D12/86

[56] References Cited
UNITED STATES PATENTS

| | | | |
|---|---|---|---|
| D97,908 | 12/1935 | Catalano.................. | D14/3 (4.6) |
| D180,872 | 8/1957 | Giacosa.................. | D14/3 (4.6) |
| D185,375 | 6/1959 | Loewy..................... | D14/3 (4.6) |
| D206,063 | 10/1966 | Mitchell................... | D14/3 (4.6) |
| D217,905 | 6/1970 | Lamborghini............ | D14/3 (4.6) |

Primary Examiner—Robert J. Spar
Assistant Examiner—Leslie J. Paperner
Attorney, Agent, or Firm—Craig & Antonelli

[57] ABSTRACT

A passenger motor vehicle with two side windows, in which the lower edges of the two window openings of a side rise in the rearward direction and the beginning of the lower edge of the rear opening is disposed lower than the rear end of the lower edge of the front window opening.

20 Claims, 3 Drawing Figures

INVENTOR
KARL WILFERT
ATTORNEYS

PASSENGER MOTOR VEHICLE

The present invention relates to a passenger motor vehicle with two side windows disposed one behind the other.

With the known passenger motor vehicles the lower edges and the upper edges of the side window openings, disposed one behind the other, extend as a rule approximately horizontally so that good visibility conditions are achieved. It is also known already for the purpose of achieving a particularly aesthetic impression to cause the lower edge of a window opening or cut-out to rise slightly.

The very large, prior art side windows enable good visibility conditions; however, this advantage is realized with the acceptance of the disadvantage that the strength and rigidity of the lateral body parts is reduced and practically no plastically deformable body parts are present within the area of the shoulders and of the heads of the vehicle passengers. This leads to a considerable impairment of the safety for the vehicle passengers.

The present invention therefore aims at eliminating these disadvantages without essentially impairing the visibility conditions. Accordingly, the present invention essentially consists in that the lower edges of the window openings or cut-outs rise in the rearward direction and the beginning of the lower edge of the rear window opening or cut-out is disposed lower than the rear end of the lower edge of the front window opening or cut-out. This arrangement of the lower edges of the side windows openings, which appears from the outside somewhat saw-tooth like, offers an increase in protection in particular for the shoulders or heads of the vehicle passengers.

For the further protection of the heads and shoulders of the vehicle passengers, it is advantageous if the rear, upwardly directed edges of the body parts forming the window openings or cut-outs, are enlarged or widened in the downward direction. A further increase of the rigidity and of the protection without essential reduction in visibility can be achieved if the upper edges of the window openings drop in the rearward direction and the beginning of the upper edge of the rear window opening is disposed higher than the rear end of the upper edge of the forward window opening.

A very safe and aesthetically appealing construction of the present invention is obtained if, in each case, the lower edges and/or the upper edges of the window openings or cut-outs of the side windows disposed one behind the other, extend parallel or approximately parallel to one another.

Accordingly, it is an object of the present invention to provide a passenger motor vehicle which avoids by simple means the aforementioned shortcomings and drawbacks encountered in the prior art.

It is another object of the present invention to provide a passenger motor vehicle which increases the rigidity of the lateral body parts, especially within the area of the shoulders and heads of the passengers without significantly reducing the visibility conditions.

A further object of the present invention resides in a passenger motor vehicle which achieves the aforementioned aims and objects by an arrangement of the body parts which is aesthetically pleasing to a viewer of the vehicle.

These and further objects, features and advantages of the present invention will become more obvious from the following description when taken in connection with the accompanying drawing which shows, for purposes of illustration only, several embodiments in accordance with the present invention, and wherein.

Figure 1:
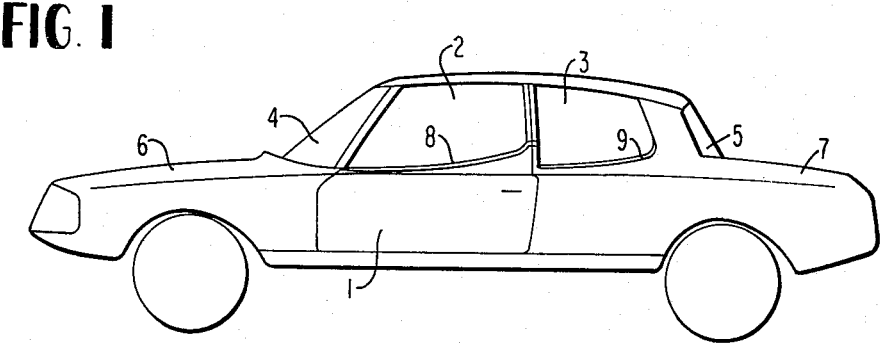
FIG. 1 is a schematic side view of a passenger motor vehicle in accordance with the present invention.

Referring now to the drawing wherein like reference numerals are used throughout the various views to designate like parts, and more particularly to FIG. 1, the passenger motor vehicle illustrated in this figure in side view, includes on each side a door 1. In order to create good visibility conditions for the driver and for the remaining vehicle passengers, large side windows 2 and 3 are provided in addition to the large windshield pane 4 and the rear window pane 5. The lower edges of the windshield 4 and of the rear window 5 are determined by the ends of the engine hood 6 and of the luggage space hood 7.

In order to achieve an increased protection for the shoulders and heads of the vehicles passengers, notwithstanding the large side window panes 2 and 3, the lower edges 8 and 9 of the window openings or cut-outs of the door 1 and of the adjoining rear section of the body are so constructed in the embodiment according to FIG. 1 that they rise relatively strongly in the rearward direction. The lower edge 9 of the rear side window opening thereby commences below the rear end of the lower edge 8 of the front side window opening so that the two lower edges 8 and 9 of two window openings or cut-outs, disposed one behind the other, of the side windows 2 and 3 pass over into one another with a step or shoulder, as viewed in side view, and have an approximately saw tooth-shaped profile. On the one hand, a larger impact surface for the vehicle passengers is created by the rise of these lower edges 8 and 9 while, on the other, a reinforcement of the door 1 and of the rear section of the body is achieved thereby.

Figure 2:
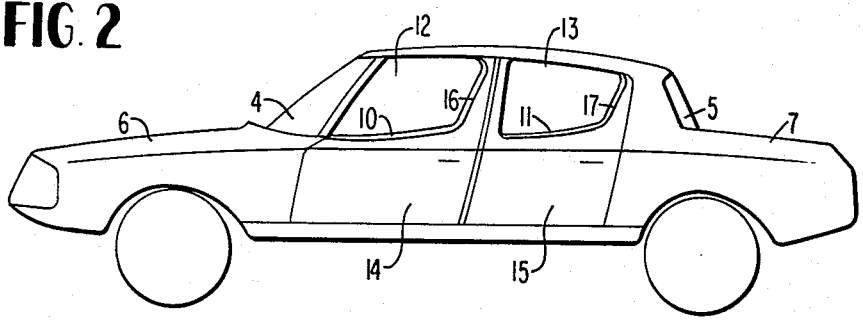
FIG. 2 is a schematic side view of a modified embodiment of a four-door passenger motor vehicle in accordance with the present invention.

A four-door passenger motor vehicle is illustrated in FIG. 2 in which in addition to the rising, lower edges 10 and 11 of the window openings or cut-outs for the side window openings 12 and 13 of the doors 14 and 15, the upwardly directed rear edges 16 and 17 of these body parts are enlarged or widened in the downward direction with respect to the door gap or joint. Also by this measure, the impact surface is increased and the flank protection is improved without having to accept larger visibility impairments or reductions.

Figure 3:
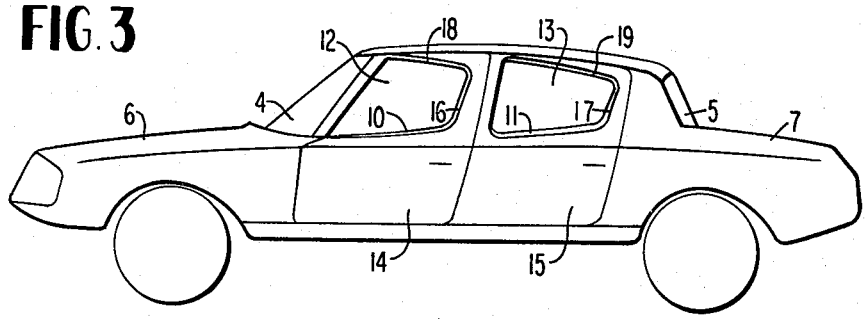
FIG. 3 is a schematic side view of a still further modified embodiment of a passenger motor vehicle in accordance with the present invention.

In the embodiment according to FIG. 3, in addition to the rising, lower edges 10 and 11 and the widened rear edges 16 and 17 of the window openings or cut-outs of the side windows 12 and 13, the upper edges 18 and 19 of the window openings or cut-outs of the two doors 14 and 15 are so constructed that they drop down in the rearward direction whereby the beginning of the upper edge 19 of the rear window opening is disposed higher than the rear end of the upper edge 18 of the front window opening.

In the embodiments according to FIGS. 1 and 3, the lower edges 8, 9 and 10, 11 and the upper edges 18 and 19 of the window openings or cut-outs extend parallel to one another so that a particularly pleasing aesthetic over-all impression of the vehicle results.

While I have shown and described only three embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A passenger motor vehicle with two side windows disposed one behind the other, characterized in that the lower edges of the window openings rise in the rearward direction and the beginning of the lower edge of the rear window opening is disposed lower than the rear end of the lower edge of the front window opening, said window openings being disposed immediately adjacent one another separated only by vehicle body parts forming a rear upwardly extending edge of the front window opening and a front upwardly extending edge of the rear window opening, and characterized in that the body parts forming the rear, upwardly directed edges of the side windows slope forwardly in the downward direction from the upper to lower ends thereof.

2. A passenger motor vehicle according to claim 1, characterized in that the lower edges of the window openings of the side windows disposed one behind the other, extend approximately parallel to one another.

3. A passenger motor vehicle according to claim 1, characterized in that at least one of the upper and lower edges of the window openings of the side windows extend parallel to one another.

4. A passenger motor vehicle according to claim 1, wherein each of said lower edges rise substantially continuously in the rearward direction from adjacent the forward ends thereof to the rearward ends thereof.

5. A passenger motor vehicle according to claim 1, wherein two side doors are provided, one behind the other, and wherein said window openings are formed in respective ones of said side doors.

6. A passenger motor vehicle according to claim 5, wherein each of said lower edges rise substantially continuously in the rearward direction from adjacent the forward ends thereof to the rearward ends thereof.

7. A passenger motor vehicle with two side windows disposed one behind the other, characterized in that the lower edges of the window openings rise in the rearward direction and the beginning of the lower edge of the rear window opening is disposed lower than the rear end of the lower edge of the front window opening, and characterized in that the body parts forming the rear, upwardly directed edges of the side windows slope forwardly in the downward direction from the upper to lower ends thereof.

8. A passenger motor vehicle according to claim 7, characterized in that the upper edges of the window openings drop down in the rearward direction and the beginning of the upper edge of the rear opening is disposed higher than the rear end of the upper edge of the front window opening.

9. A passenger motor vehicle according to claim 8, characterized in that the lower edges of the window openings of the side windows disposed one behind the other, extend approximately parallel to one another.

10. A passenger motor vehicle according to claim 8, characterized in that the upper edges of the window openings of the side windows, disposed one behind the other, extend approximately parallel to one another.

11. A passenger motor vehicle according to claim 8, characterized in that the lower edges as well as the upper edges of the window openings of the side windows, disposed one behind the other, extend approximately parallel to one another.

12. A passenger motor vehicle according to claim 8, characterized in that at least one of the upper and lower edges of the window openings of the side windows extend parallel to one another.

13. A passenger motor vehicle according to claim 8, characterized in that both the upper and lower edges of the window openings of the two side windows disposed one behind the other extend parallel to one another.

14. A passenger motor vehicle according to claim 7, wherein each of said lower edges rise substantially continuously in the rearward direction from adjacent the forward ends thereof to the rearward ends thereof.

15. A passenger motor vehicle according to claim 7, wherein two side doors are provided, one behind the other, and wherein said window openings are formed in respective ones of said side doors.

16. A passenger motor vehicle according to claim 15, wherein each of said lower edges rise substantially continuously in the rearward direction from adjacent the forward ends thereof to the rearward ends thereof.

17. A passenger motor vehicle with two side windows disposed one behind the other, characterized in that the lower edges of the window openings rise in the rearward direction and the beginning of the lower edge of the rear window opening is disposed lower than the rear end of the lower edge of the front window opening, and characterized in that the upper edges of the window openings drop down in the rearward direction and the beginning of the upper edge of the rear opening is disposed higher than the rear end of the upper edge of the front window opening.

18. A passenger motor vehicle according to claim 17, characterized in that the upper edges of the window openings of the side windows, disposed one behind the other, extend approximately parallel to one another.

19. A passenger motor vehicle according to claim 17, characterized in that the lower edges as well as the upper edges of the window openings of the side windows, disposed one behind the other, extend approximately parallel to one another.

20. A passenger motor vehicle according to claim 17, characterized in that both the upper and lower edges of the window openings of the two side windows disposed one behind the other extend parallel to one another.

* * * * *